United States Patent
Brown et al.

(10) Patent No.: US 9,552,173 B2
(45) Date of Patent: Jan. 24, 2017

(54) ROBUST DATA REPLICATION

(71) Applicant: GLOBALFOUNDRIES Inc., Grand Cayman (KY)

(72) Inventors: Joanna K. Brown, Hampshire (GB); Gordon J. Cockburn, Southampton (GB); Carlos F. Fuente, Hampshire (GB); John P. Wilkinson, Wiltshire (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 157 days.

(21) Appl. No.: 14/494,901

(22) Filed: Sep. 24, 2014

(65) Prior Publication Data

US 2015/0106549 A1   Apr. 16, 2015

(30) Foreign Application Priority Data

Oct. 14, 2013   (GB) .................................. 1318114.4

(51) Int. Cl.
*G06F 12/00* (2006.01)
*G06F 13/00* (2006.01)
(Continued)

(52) U.S. Cl.
CPC ............. *G06F 3/065* (2013.01); *G06F 3/0619* (2013.01); *G06F 3/0679* (2013.01);
(Continued)

(58) Field of Classification Search
None
See application file for complete search history.

(56) References Cited

U.S. PATENT DOCUMENTS 8,434,083 B2   4/2013   Burr et al.
8,468,313 B2   6/2013   Yim et al.
(Continued)

FOREIGN PATENT DOCUMENTS

CN   103124961 A   5/2013

OTHER PUBLICATIONS

Natanzon, et al., "Dynamic Synchronous/Asynchronous Replication", ACM Transactions on Storage, vol. V, No. N, Article A, Publication date: Jan. YYYY, http://www.cs.bgu.ac.il/~ebachmat/dynamic-tos.pdf.

(Continued)

*Primary Examiner* — Sean D Rossiter
(74) *Attorney, Agent, or Firm* — Michael LeStrange; Andrew M. Calderon; Roberts Mlotkowski Safran Cole & Calderon P.C.

(57) ABSTRACT

Disclosed is a system for replicating data. The system may comprise a plurality of nodes preferably organized in groups with one of the nodes acting as a coordinator node. The nodes are configured to receive write requests from an external server and to apply these write requests to a data storage source of the data storage system. The write requests typically belong to a batch of independent write actions identified by a batch sequence number. Each node stores the write request in non-volatile memory with the coordinator node monitoring which batches are secured in their entirety in non-volatile memory. The coordinator node authorizes all other nodes to sequentially replicate the write requests in their non-volatile memory to the data storage source for all writes up to the highest batch sequence number for which all writes have been secured in non-volatile memory.

19 Claims, 3 Drawing Sheets

(51) Int. Cl.
*G06F 3/06* (2006.01)
*G06F 11/20* (2006.01)

(52) U.S. Cl.
CPC ...... *G06F 11/2064* (2013.01); *G06F 11/2074* (2013.01); *G06F 11/2089* (2013.01); *G06F 2206/1014* (2013.01)

(56) References Cited

U.S. PATENT DOCUMENTS

| | | | |
|---|---|---|---|
| 8,856,593 B2* | 10/2014 | Eckhardt | G06F 11/2028 709/217 |
| 2004/0268177 A1 | 12/2004 | Ji et al. | |
| 2005/0102554 A1 | 5/2005 | Zohar et al. | |
| 2008/0016300 A1* | 1/2008 | Yim | G06F 11/2064 711/162 |
| 2008/0154777 A1* | 6/2008 | Achiwa | G06F 11/1096 705/51 |
| 2009/0043979 A1 | 2/2009 | Jarvis | |
| 2011/0320403 A1 | 12/2011 | O'Krafka et al. | |
| 2012/0011398 A1* | 1/2012 | Eckhardt | G06F 11/2028 714/15 |
| 2012/0215994 A1 | 8/2012 | Burr et al. | |
| 2013/0145117 A1 | 6/2013 | Wilkinson | |
| 2013/0226870 A1 | 8/2013 | Dash | |

OTHER PUBLICATIONS

"Asynchronous Remote Replication (Disaster Recovery)", http://www.datacore.com/Software/Features/List-of-Features/Asynchronous-Remote-Replication.aspx.

* cited by examiner

ROBUST DATA REPLICATION

FIELD OF THE INVENTION

The present invention relates to a data storage system for replicating data from an external server providing a sequence of batches comprising independent write actions.

The present invention further relates to a data storage architecture including such a data storage system.

The present invention yet further relates to a method of replicating data from an external server providing a sequence of batches comprising independent write actions of onto such a data storage system.

BACKGROUND

In data storage systems, asynchronous replication may be implemented by identifying groups of independent writes submitted from external server systems at a production site, forming batches of these writes, and applying these batches in sequential order at a disaster recovery (DR) site. Writes are considered independent if they are submitted to the storage system within the same time frame, i.e. none of these writes is completed back to the server before another write in the batch is submitted to the storage system. By applying batches serially, data consistency of the volumes at the DR site is maintained at all times.

For performance reasons, on a distributed storage system the set of independent writes in a batch must be pessimistic, i.e. fewer writes are considered independent than may be the case. This means that each batch may contain a small number of writes only.

At the DR site, which may also be a distributed storage system, the writes in a batch are typically applied to many storage volumes across the storage system. Consequently, the serial processing of batches must be coordinated across the entire distributed storage system, through messaging between the different elements of the distributed system to ensure data consistency. The batches may be identified using some form of serial number, as for instance is disclosed in U.S. Pat. No. 8,468,313 B2.

The throughput of such asynchronous replication is therefore limited by the messaging within the DR site; the number of batches per second that can be processed is limited by the number of batch synchronization messages that can be sent and received at the same time. The performance of the asynchronous replication is also negatively affected by any delay to any write the DR site is processing as part of a batch, as the serialization of batches ensures that the next batch cannot be started until all the writes from the batch in progress are complete. Delays to writes can happen for many reasons: when a multitasking operating system is used within the storage system, writes may be delayed for hundreds of milliseconds just from task preemption.

Such a design thus limits maximum throughput. As there is little scope to catch up, such asynchronous replication designs usually become unstable following any delays to any of the writes.

One approach to solve this problem is to group many batches together and apply them atomically. This may be done using an incremental point-in-time copy. Such a process requires additional storage, and tight integration between the replication, point-in-time copy, and any caching features. It also requires coordination of triggering many point-in-time copies across the whole distributed DR storage system. This means that there will be significant periods during which no further replication writes may be processed because the point-in-time copies are starting. These new replication writes then have to be absorbed somewhere in additional storage, or else new writes from the external server systems at the production site will have to be delayed. It is clear that this is far from ideal from a performance perspective.

BRIEF SUMMARY OF THE INVENTION

The present invention seeks to provide a data storage system capable of maintaining data consistency in a more efficient manner.

The present invention further seeks to provide a data storage architecture including such a data storage system.

The present invention yet further seeks to provide a method of replicating data from an external server providing a sequence of batches comprising independent write actions onto such a data storage system.

According to an aspect, there is provided a data storage system for replicating data from an external server providing a sequence of batches comprising independent write actions, the data storage system comprising a data storage resource comprising a plurality of data storage volumes; and a plurality of nodes communicatively coupled to each other and to the data storage resource, each node having access to a non-volatile memory and being adapted to receive a write request including a write action belonging to one of said batches and a batch sequence number identifying the position of said batch in said sequence from the external server and to store the write request into its non-volatile memory; the data system further comprising a further node adapted to act as a coordinator node, said coordinator node being adapted to receive batch information from the external server indicating the batch sequence number and the number of write actions in said batch; and periodically communicate with the other nodes to determine the highest batch sequence number for which all write actions have been written into the respective non-volatile memories and to communicate a first batch sequence number indicative of the highest batch sequence number to the other nodes; wherein each node is further adapted to store the communicated first batch sequence number; replicate all write actions belonging to any batch having a sequence number not exceeding the communicated first batch sequence number from its non-volatile memory to a data storage volume in sequential order; and upon completion of the replication, remove the corresponding write request from its non-volatile memory.

The data storage system of the present invention guarantees data consistency with the external server by storing write requests originating from the external server into non-volatile memory at each node and by creating awareness across all nodes of the batches of independent write requests that have been captured in their entirety in these non-volatile memories. This knowledge allows the data storage system to be rolled forward to any such batch of write instructions issued by the external server without the need to capture periodic snapshots of the data storage resource or the need to wait for the completion of a batch to be written to the data storage resource in its entirety before a next batch can be processed.

In particular, by having a rolling range of batches of writes that may be written in parallel across the data storage system, with new batches being permitted as older ones complete, the process described in the background section can be pipelined and messaging latency within the data storage system can be hidden from the external server. This overcomes the problem of individual batches that take a long time to write to the data storage system negatively affecting overall performance. This can be achieved without requiring additional storage at the data storage system as the permitted batches of writes are small enough to be stored in a small non-volatile memory such as system memory.

In an embodiment, the further node is a node from the plurality of nodes. This has the advantage that the role of coordinator node may be assigned dynamically to any node of the system.

Preferably, the nodes are grouped into groups comprising an active node and at least one failover node, each group being responsible for replicating said write actions to a unique set of data storage volumes, wherein each node in the group is further adapted to store the write request into its non-volatile memory in response to a store instruction from one node in said group receiving the request; and acknowledge completion of the write instruction to the one node; and wherein one node in said group is further adapted to communicate to the coordinator node that the request is stored in the respective non-volatile memories of all nodes in said group upon receiving the acknowledgements from the other nodes in said group. The addition of redundant nodes further improves the robustness of the data storage system and reduces the downtime of the data storage system as a result.

In a particularly advantageous embodiment, each node is adapted to compare the respective target addresses of the write instructions stored in its non-volatile memory and to initiate replicating a next write instruction before the completion of the replication of a previous write instruction if the next write instruction has a unique target address in the non-volatile memory. This further improves the performance of the data storage system as write requests can be processed in a pipelined fashion as long as no data dependencies exist between write requests to be replicated by a node.

The first batch sequence number may be the previous highest batch sequence number successfully transmitted to all other nodes; and wherein the coordinator node is further adapted to communicate the highest batch sequence number to all available nodes. For instance, the first batch sequence number may be used by the nodes in normal mode whereas the highest batch sequence number can be used in a recovery mode as this sequence number indicates the last batch in the sequence of batches that has been fully captured in the respective non-volatile memories of the nodes.

The coordinator node may be further adapted to send a batch completion message for a particular batch to the external server upon the highest batch sequence number exceeding the batch sequence number of the particular batch. This has the advantage that the external server can be notified before the write requests of the particular batch have been replicated into the data storage resource, which may help to reduce latency at the external server.

In an embodiment, the system is adapted to dynamically assign the role of coordinator node to one of said nodes at initialization or after failure of the previously assigned coordinator node. This further increases the flexibility and robustness of the data storage system, as failure of the coordinator node does not automatically lead to the failure of the data storage system as a whole.

In a particularly preferred embodiment, the system is further adapted to select a highest batch sequence number stored in the non-volatile memory of one of said nodes upon the external server resending one or more previously received write requests; and wherein the coordinator node is adapted to communicate the selected highest batch sequence number to the other nodes; and wherein each node is adapted to replicate all write actions belonging to any batch having a sequence number not exceeding the communicated selected first batch sequence number from its non-volatile memory to a data storage volume. The resending of the write actions typically signals a temporary loss of communication between the external server and a node or between a node and the set of volumes for which the node is responsible. The storage of the write requests in the respective non-volatile memories of the various nodes and the global awareness of which batches have been captured in their entirety in these non-port our memories allows for the data storage system to be rolled forward to a state that is consistent with a state of the external server without having to process the resent messages.

The selected batch sequence number may be selected from any node, such as the first node to come back online, which has the consequence that the selected batch sequence number is not necessarily the highest batch sequence number that exists across the system. This is not considered a disadvantage as the main purpose of the present invention is to ensure that the data storage system can be restored to a state that is consistent with the external server. Nevertheless, in an embodiment of system is further adapted to find the highest batch sequence number stored in the respective non-volatile memories of said nodes and to select the thus found highest batch sequence number to ensure that the data storage system is rolled forward to the highest possible batch sequence number.

According to another aspect, there is provided a data storage architecture including a primary data storage system and a secondary data storage system comprising the data storage system according to an embodiment of the present invention for backing up the primary data storage system, wherein the primary data storage system comprises a plurality of primary nodes each adapted to issue a write request to one of the nodes of the secondary data storage system; and a primary server adapted to send batch information to the coordinator node of the secondary data storage system. Such an architecture enjoys improved performance and data replication robustness for the reasons already explained above.

According to yet another aspect, there is provided a method of replicating data from an external server providing a sequence of batches comprising independent write actions onto a data storage system comprising a plurality of nodes each having access to a non-volatile memory and a data storage resource comprising a plurality of data storage volumes, wherein each node is associated with a set of data volumes, the method comprising appointing one of said nodes as a coordinator node; receiving, on the coordinator node, batch information from the external server indicating the batch sequence number and the number of write actions in said batch; receiving, on one of said nodes, a write request including a write action belonging to one of said batches and a batch sequence number identifying the position of said batch in said sequence from an external server and to store the write request into its non-volatile memory; informing the coordinator node that the write request has been stored into the non-volatile memory; determining, at the coordinator node, the highest batch sequence number for which all write actions have been written into the respective non-volatile memories; communicating a first batch sequence number indicative of the highest batch sequence number from the coordinator node to the other nodes; storing the communicated first batch sequence number in the non-volatile memories of all nodes receiving said communication; and for each node receiving said communication replicating all write actions belonging to any batch having a sequence number not exceeding the communicated first batch sequence number from its non-volatile memory to a data storage volume in sequential order; and removing the corresponding write request from its non-volatile memory upon completion of the replication.

In an embodiment, the nodes are grouped into groups comprising an active node and at least one failover node, each group being responsible for replicating said write actions to a unique set of data storage volumes, the method further comprising for each node in a group storing the write request into its non-volatile memory in response to a store instruction from one node in said group receiving the request; and acknowledging completion of the write instruction to the one node; and communicating to the coordinator node that the request is stored in the respective non-volatile memories of all nodes in said group upon receiving the acknowledgements from the other nodes in said group.

The method may further comprise, for each node: comparing the respective target addresses of the write instructions stored in its non-volatile memory; and initiating replication of a next write instruction before the completion of the replication of a previous write instruction if the next write instruction has a unique target address in the non-volatile memory.

In an embodiment, the first batch sequence number is the previous highest batch sequence number successfully transmitted to all other nodes; the method further comprising communicating the highest batch sequence number from the coordinator node to all available nodes.

The method may further comprise sending a batch completion message for a particular batch from the coordinator node to the external server upon the highest batch sequence number exceeding the batch sequence number of the particular batch.

In a particularly advantageous embodiment, the method further comprises selecting a highest batch sequence number stored in the non-volatile memory of one of said nodes upon the external server resending one or more previously received write requests; and communicating the selected highest batch sequence number from the coordinator node to the other nodes; and at each node, replicating all write actions belonging to any batch having a sequence number not exceeding the communicated selected first batch sequence number from its non-volatile memory to a data storage volume.

It will be understood that the various embodiments of the inventive method as described above benefit from the same advantages as previously described for the data storage system.

BRIEF DESCRIPTION OF THE DRAWINGS

Preferred embodiments of the present invention will now be described, by way of example only, with reference to the following drawings, in which.

DETAILED DESCRIPTION OF THE EMBODIMENTS

Figure 1:
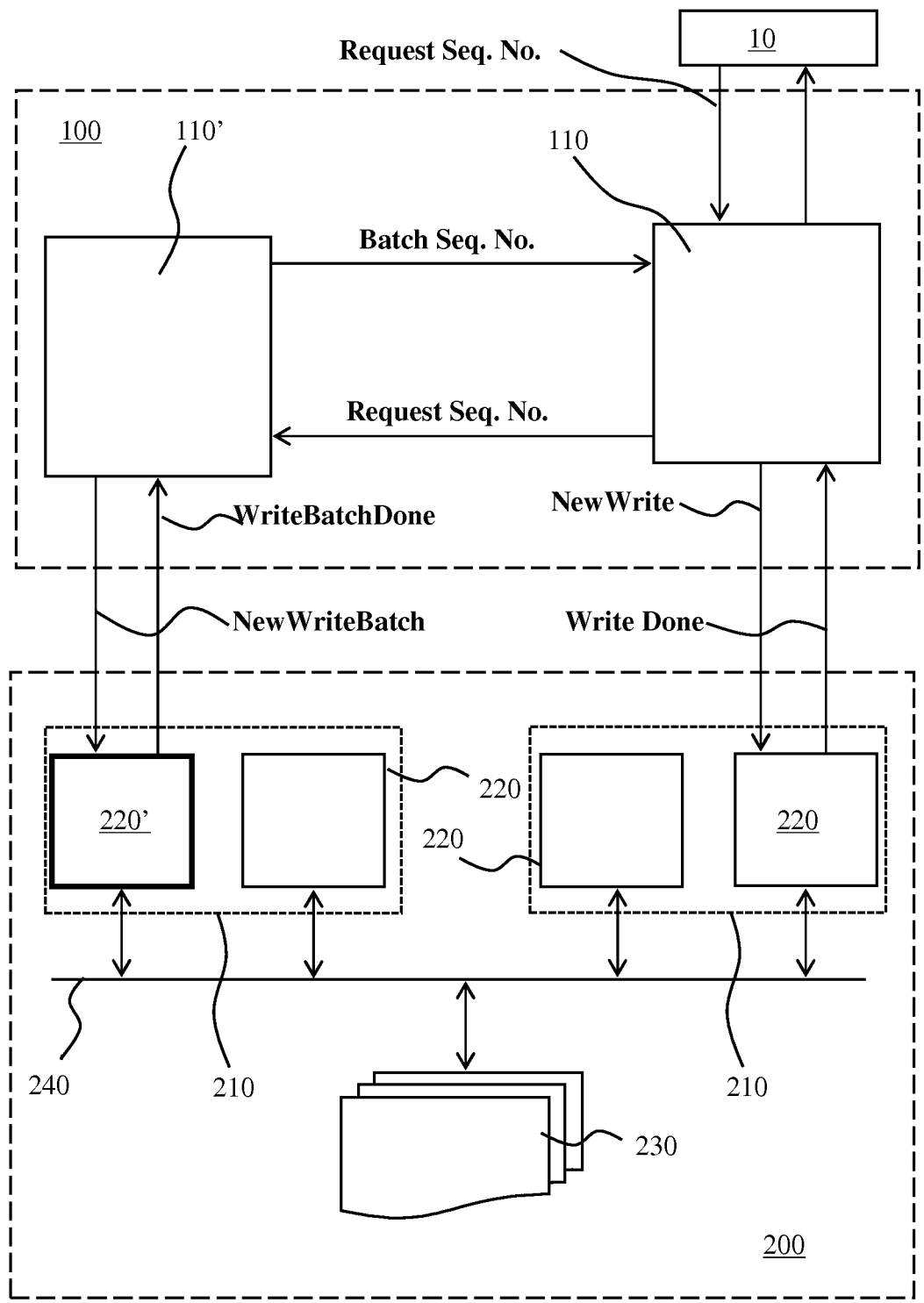
FIG. 1 schematically depicts a data storage architecture according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

FIG. 1 schematically depicts a data storage architecture according to an embodiment of the present invention. The data storage architecture comprises a production data storage system 100, which will also be referred to as the primary data storage system and a disaster recovery or backup data storage system 200, which will also be referred to as the secondary data storage system. The primary data storage system 100 comprises nodes 110 and 110' and further comprises a data storage medium (not shown). The secondary data storage system comprises groups 210 of nodes 220 and 220' that have access to multiple volumes of data storage resource 230. The multi-volume data storage resource 230 may take any suitable shape, e.g. magnetic disk storage, tape storage or any functional or structural equivalent thereof. Each node 220 and 220' has access to a non-volatile memory (not shown), which may be a dedicated or distributed non-volatile memory. In an embodiment, the respective non-volatile memories form part of a system memory. For instance, the data storage system 100 may present regions of system memory as being non-volatile by storing these regions to long-term storage when a node 220 shuts down, and restoring these regions when the node 220 starts up again. This implementation is particularly suitable in a data storage system 100 comprising node redundancy as will be explained in more detail below, to enforce the desired non-volatile behaviour in cases where a node 220 halts or loses power without being able to save its data to disk.

In an alternative embodiment, each node 220 includes a dedicated non-volatile memory.

It is noted that the terms primary and secondary data storage system may identify discrete storage systems by way of non-limiting example. For instance, a data storage system may act as a primary storage system for some volumes being replicated, and as a secondary storage system for others. This typically relates to a system in which data storage is being used symmetrically, with replication taking place in both directions.

The nodes 220 and 220' are communicatively coupled via communication component 240, e.g. a data communication bus, dedicated point-to-point connections or a combination thereof. As shown in FIG. 1, the communication component 240 may also be used for communications between the nodes 220 and 220' and the various volumes of the data storage source 230. Alternatively, the secondary data storage system 200 may comprise a further communication component for communications between the nodes 220 and 220' and the various volumes of the data storage source 230.

In the context of the present application, where reference is made to nodes of a data storage system, it should be understood that such nodes may be any device capable of invoking I/O communications between a data storage source such as data storage source 230 and an external source. Such a node may for instance be a microprocessor, a microcontroller and the like.

As will be explained in more detail later, in a preferred embodiment the nodes 220 of the secondary data storage system 200 are organised in groups 210, with each group comprising at least one redundant or non-preferred node providing failover for the active or preferred node in that group. Such a non-preferred node may be inactive if the preferred node is active or online. Two groups 210 are shown by way of non-limiting example only, as it should be understood that the secondary data storage system 200 may have any suitable number of groups 210 of nodes 220. In an embodiment, a first node 220 may be the preferred node for a first volume of the data storage resource 230 and a second node 220 may be the preferred node for a second volume of the data storage resource 230, with these respective nodes acting as failover nodes for each other. In other words, in at least some embodiments, the redundancy built in to the secondary storage system 200 does not necessarily mean that the secondary data storage system 200 includes additional nodes 220 or indeed that some of the nodes 220 are dormant or inactive if every preferred node is online. It will be understood that in such an embodiment, a node may belong to more than one group, e.g. may be a preferred node of one group and a non-preferred node of another group.

There are two roles that nodes can take at each site: coordinator and worker. A worker node is identified by a plain reference number in FIG. 1, i.e. 110 and 220, whereas a coordinator node is identified by a reference number combined with a quotation mark, i.e. 110' and 220'. There is a single coordinator node at each site, coordinating batches, and some messages are sent from the primary coordinator to the secondary coordinator. In some embodiments, all nodes are worker nodes, i.e. the coordinator node is also a worker node, and the worker role sends volume-specific messages from the node 110 in the production data storage system 100 the write was submitted to, to a node 220 in the secondary data storage system 200 with access to a volume of the data storage source 230. In alternative embodiments, the coordinator node 220' is a separate node that does not perform a worker role at the same time. In these embodiments, the coordinator node 220' may be selected from the same pool of nodes from which the worker nodes 220 are selected. This is for instance a useful implementation if the coordinator role is resource-intensive, such that the performance of a secondary worker node 220 is not compromised by also having to perform the coordinator role.

In the primary data storage system 100, a primary worker node 110 is responsible for intercepting writes from external host systems 10 to the local storage, asking the primary coordinator 110' for sequencing information (RequestSeq.No. Message) for the writes, and sending duplicates of these writes to secondary worker nodes 220 together with the sequencing information for those writes. The primary coordinator node 110' is responsible for generating sequencing information (BatchSeq.No) for the primary nodes 110, such that all writes within a batch with a given sequence number are independent and may be written simultaneously, and sending write counts for each to the secondary coordinator node 220'. The information provided by the primary coordinator node 110' will also be referred to as batch information.

In the secondary data storage system 200, a secondary worker node 220 is responsible for receiving writes from primary nodes 110 and applying them consistently to secondary data storage source 230 based on the sequencing information provided by the primary nodes 110, as coordinated by the secondary coordinator node 220'. The secondary coordinator node 220' is responsible for coordinating writes in a consistent fashion across all the secondary nodes 220 based on the write counts provided by the primary coordinator node 110' in the provided batch information.

As previously explained, a node may be combining the role of coordinator and worker. Any method may be used to resolve which node acts as the primary or secondary coordinator node, using a cluster-based algorithm to vote for a particular node, or a particular node may be chosen with a static algorithm, e.g. the node with the lowest ID.

FIG. 1 further depicts the messages between the primary data storage system 100 and the secondary data storage system 200:

NewWriteBatch is batch information provided by the primary coordinator node 110' to the secondary coordinator node 220', and describes a batch of writes that are independent and can be written together. This message typically comprises a batch sequence number, and a count of the writes that may be expected within that batch.

NewWrite is a write request that describes an individual write, and which is sent from a primary worker node 110 to a secondary worker node 220. This message typically comprises the write data, a reference number, the target volume index and LBA (logical block address) of the data storage source 230 the write action should be applied to, and the batch sequence number that write action needs to be written in to maintain consistency of the image on the volume of the data storage source 230.

WriteBatchDone describes that a batch has been completely written at the secondary data storage system 200 to ensure that the primary data storage system 100 has a limited number of batches outstanding. This message is provided by the secondary coordinator node 220' to the primary coordinator node 110', and typically comprises the relevant batch sequence number.

WriteDone describes that an individual write has been applied by a secondary worker node 220 successfully, and all resources for that write may be freed by the primary worker node 110. This message is communicated by the secondary worker node 220 to the primary worker node 110 from which the write request originated, and typically comprises the reference number included in the write request.

In some prior art designs, the secondary coordinator node 220' and worker nodes 220 queue all NewWriteBatch and NewWrite messages until they are ready to handle them. The queues are both maintained in sequence number order, with new messages added at the high-sequence-number end, and messages being dequeued for processing at the low-sequence-number end. When the protocol has just started, or the writes from a previous batch have all been applied, the secondary coordinator node 220' implements the following sequence to apply writes consistently:

1. If the secondary coordinator node 220' has just completed a batch, it waits until it has the NewWriteBatch message with the following sequence number.

2. When the secondary coordinator node 220' has this following NewWriteBatch message queued, it removes it from the queue for processing, and notes the number of writes expected.

3. The secondary coordinator node 220' then sends a message to each secondary worker node 220 permitting them to write all writes associated with the sequence number of the batch being processed.

4. Each secondary worker node 220 dequeues any NewWrite messages queued that have the appropriate sequence number, and immediately applies them to the secondary data storage source 230.

5. As each write to data storage source 230 completes back to a secondary worker node 220, that secondary worker node 220 will send a message to the secondary coordinator node 220' that a write has completed and in addition will send a WriteDone message to the primary worker node 110 from which the write request originated.

6. The secondary coordinator node 220' counts the write completion messages from the respective secondary worker nodes 220. When it has received the same number as the NewWriteBatch message specified, it will send a WriteBatchDone message to the primary coordinator, and be prepared to start on the next batch. Continue from step 1.

The same sequencing and the same batching applies regardless of volume, in order to allow writes to be applied consistently across multiple volumes. Consequently, in such prior art designs, the time it takes to move from one batch to the next equals the longest time it takes a secondary worker node 220 to apply any write in that batch, added to the roundtrip messaging time from the secondary coordinator node 220' to the secondary worker nodes 220. This has three problems:

1. Any slow write in step 4 will slow progression to the next batch. If a write to e.g. a rebuilding array takes 200 ms, all writes to all volumes of the secondary data storage source 230 will be suspended for that time. Context switching on a heavily loaded multithreaded operating system can similarly impact write time.

2. Any slow messaging between nodes 220 will slow progression to the next batch. If it takes 1 ms each way to send a message between the coordinator node 220' and a worker node 220, every batch will have an idle period of 2 ms during which no writes are being performed.

3. Writes at a secondary worker node 220 have to complete before the next batch can start, fully serialising batches. In contrast, at the primary worker nodes 110, writes for one batch do not have to complete before we assign further writes to the next batch. This means that the secondary worker nodes 220 will only be able to keep up with the primary worker nodes 110 if the data storage architecture experiences very low workloads, i.e. well within the storage bandwidth. However, once any secondary writes are delayed, e.g. during increased workloads, the secondary nodes 220 will be unlikely to catch up with the primary worker nodes 110 again. Eventually, the replication resources will be exhausted, and the performance problems on the secondary will impact host I/O latency significantly at the primary data storage system 100.

Figure 2:
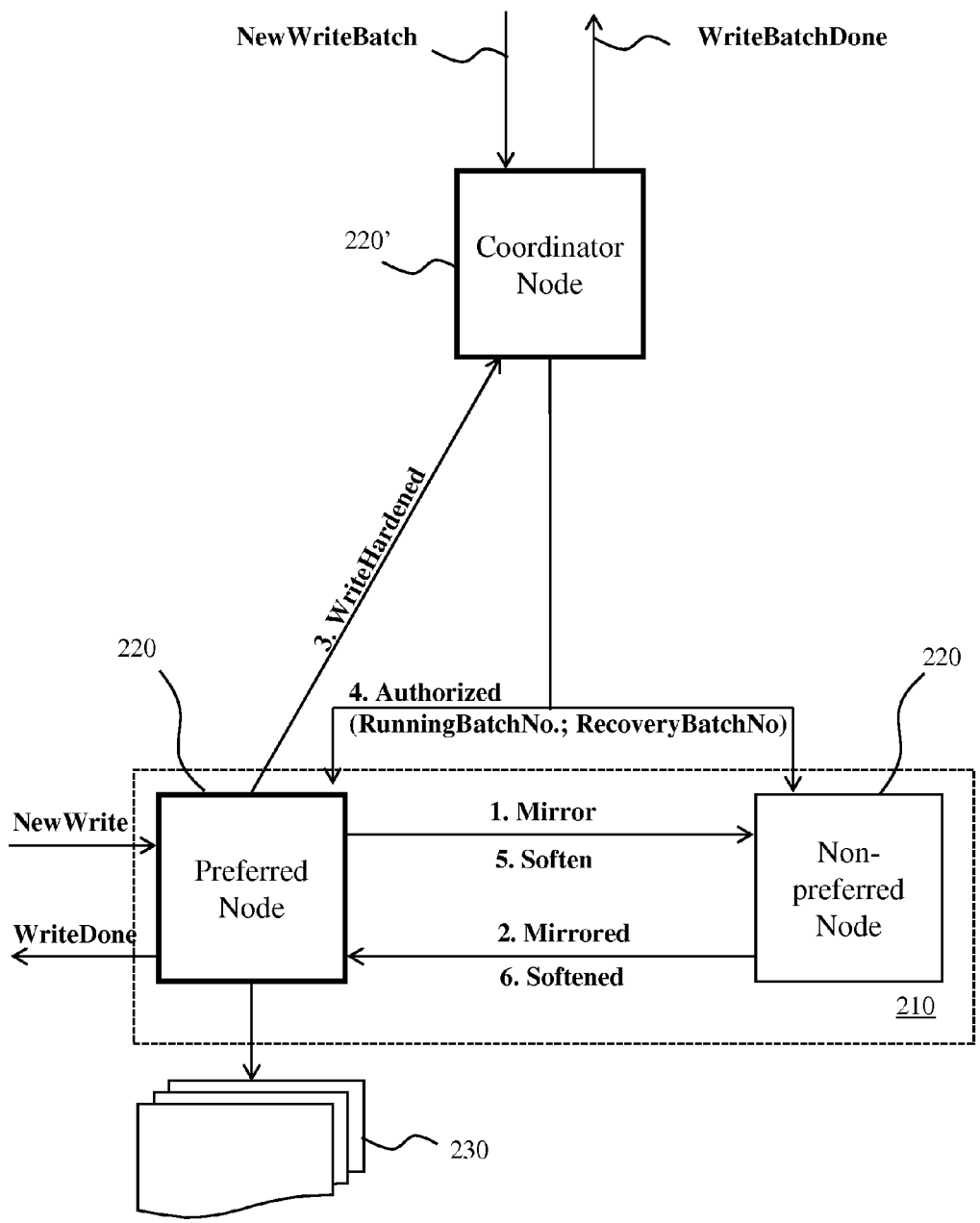
FIG. 2 schematically depicts communications between the various nodes of a data storage system in a first operating mode according to an embodiment of the present invention.

These problems are addressed in the present invention in the following manner, which will be explained in more detail with the aid of FIG. 2. Embodiments of the present invention provide a secondary data storage system 200 where data replication may be simultaneously executed over multiple batches without jeopardising data consistency between the primary data storage system 100 and the secondary data storage system 200. This is achieved in the following manner. As soon as a secondary worker node 220 receives a NewWrite message (i.e. a write request) from a primary worker node 110, it immediately copies the write data and metadata (volume index, LBA, sequence number) of this message into non-volatile storage. In case of a data storage system 200 including node redundancy, it furthermore sends a Mirror message to its partner node(s) 220 within the group 210, containing the aforementioned data and metadata for the write request. The partner node 220 also copies the data into non-volatile storage.

In case the secondary worker node 220 that received the NewWrite message is the preferred node for the volume of the secondary data storage source 230 the non-preferred companion node 220 in the group 210 sends a Mirrored message back to the preferred node, which then sends a WriteHardened message to the secondary coordinator node 220' to indicate that the write request has been (redundantly) secured in non-volatile memory. If instead the non-preferred companion node 220 in the same group 210 originally received the write request, the preferred node sends a WriteHardened message to the secondary coordinator node 220', in which case the Mirrored message may be omitted. The WriteHardened message contains the sequence number of a write that has been placed into redundant non-volatile storage.

Meanwhile, the secondary coordinator node 220' receives batch information in the form of NewWriteBatch messages from the primary coordinator node 110', and WriteHardened messages from the secondary worker nodes 220 of the various groups 210. As the NewWriteBatch message contains the number of writes in each batch, the secondary coordinator node 220' can determine when it has received the correct number of WriteHardened messages for each batch. It is important to realise that at this stage all write requests of that batch are protected from being lost upon the partial or complete loss of service of the secondary data storage system 200 as these writes have been stored in non-volatile memory across the secondary data storage system 200, without actually having been written to the data storage source 230.

In an embodiment, the secondary coordinator node 220' maintains two batch sequence numbers to control writes across the secondary worker nodes 220. The first batch sequence number will be referred to as the running sequence number. The running sequence number determines which writes a worker node 220 is permitted to apply to the data storage source 230 during normal operation of the secondary data storage system 200. The second batch sequence number will be referred to as the recovery sequence number. The recovery sequence number determines which writes a worker may be required to apply in an error recovery scenario, as will be explained in more detail later.

Initially, both the running and recovery sequence numbers are initialised by the secondary coordinator node 220' invalid batch sequence numbers. As the secondary coordinator node 220' receives WriteHardened messages for the various batches from the secondary worker nodes 220, the secondary coordinator node 220' will authorise the replication of batches for which the correct number of WriteHardened messages have been received. The coordinator node 220' sets the recovery sequence number to the greatest batch sequence number for which the WriteHardened messages have been received for all writes in that batch and all previous batches. This ensures that all corresponding write requests have been stored in non-volatile memory across the secondary data storage system 200. At this point, it is important to realise that in this manner replication of write actions belonging to multiple batches can be executed across the secondary data storage system 200 without the risk of loss of data consistency between the primary and secondary systems as long as the write instructions are replicated in batch sequence.

As soon as a valid recovery sequence number has been set by the secondary coordinator node 220', the recovery and running sequence numbers are transmitted to all secondary worker nodes 220 in an Authorized message. This message may be broadcasted or alternatively transmitted to each worker node 220 in turn. After the Authorized message is sent to each node, the secondary coordinator node 220' copies the recovery sequence to the running sequence number. The secondary coordinator node 220' continues to monitor incoming WriteHardened messages and updates the recovery sequence number as previously explained, i.e. to the highest batch sequence number for which all write actions of that batch and all previous batches have been stored in non-volatile memory. As soon as the running or recovery sequence numbers change as a consequence of this monitoring, both are again transmitted to all secondary worker nodes 220 in another Authorized message. This process may continue indefinitely.

Each secondary worker node 220 stores the most recently received value of recovery and running sequence number, e.g. in non-volatile memory. As will be apparent, the recovery sequence number indicates the highest batch sequence number that is hardened across the secondary data storage system 200. The running sequence number tells the secondary worker node 220 the lowest recovery sequence number that any other node may have. This is because the running sequence numbers stored on all secondary worker nodes 220 are always less than or equal to all the recovery sequence numbers stored on the secondary worker nodes 220 due to the fact that there may be a delay in communicating an updated recovery sequence number from the secondary coordinator node 220' to the secondary worker nodes 220.

Having received a valid running sequence number, a secondary worker node 220 immediately applies all writes up to and including that batch sequence number. The writes are applied in sequence number order, although it is generally not necessary to wait for an earlier write to complete before applying a later one. In other words, there may be a partial temporal overlap between subsequent writes. However, such overlap may only be allowed for write requests for which the secondary worker node 220 does not have another write action in non-volatile memory to be applied to the same LBA. A hash table or the like may be used to identify writes that overlap with writes already being applied, and those overlapping writes are then delayed until the earlier writes to the common regions are complete. This is to ensure correct ordering of writes. All writes preferably are applied on the preferred node to ensure the correct ordering of overlapping writes within a volume of the data storage source 230.

Upon replication of write onto the data storage source 230, the write request is removed from the non-volatile memory of the preferred secondary node 220, after which a Soften message is sent to the non-volatile memory of the non-preferred (redundant) companion node 220. This message instructs the non-preferred companion node 220 to also remove the corresponding write action from non-volatile memory in order to restore consistency between the non-volatile memories of the preferred node and its companion node. As with the overlapping writes, a hash table or the like may be used to ensure that writes sharing LBAs are removed from non-volatile memory in the correct order.

A WriteDone message is subsequently sent from a secondary worker node 220 back to the originating primary worker node 110 for a write any time after the running sequence number available to the secondary worker node 220 is greater than or equal to the batch sequence number of the write request. At this point, the write request is guaranteed to be applied (replicated) to the secondary data storage source 230 at some point.

A WriteBatchDone message is sent from the secondary coordinator node 220' to the primary coordinator node 110' for a batch once the recovery sequence number as determined by the secondary coordinator node 220' is greater than or equal to the batch sequence number. It is reiterated that the WriteBatchDone message is typically applied after all write requests have been secured in non-volatile memory across the secondary data storage system 200, whereas a WriteDone message is generated once the write request is guaranteed to be applied to the secondary data storage source 230 at some point.

The above scenario explains the operation of the secondary data storage system 200 in a normal mode according to an embodiment of the present invention. In the remainder of this description, the operation of the secondary data storage system 200 will be explained for various exceptions or problems that the data storage architecture and in particular the secondary data storage system 200 may encounter, and the recovery scenarios that secondary data storage system 200 implements in the case of such exceptions.

A first exception may be that a volume of the data storage source 230 goes offline. This means that the volume becomes unavailable to apply any further writes to it, and so the volume will not be consistent with respect to other volumes that have completed writes from later sequence numbers. To address this problem, the data storage system 200 implements the following recovery scenario; writes that are for batches with sequence numbers greater than or equal to the running sequence number are moved into a separate volume-specific queue of writes that must be applied in-order when access to the volume is restored. Writes from multiple sequence numbers may be outstanding at the same time, but as with regular write processing, no two writes to any LBA must be outstanding at the same time.

The preferred worker node 220 is used to apply the write if the node is online. If only the non-preferred worker node 220 is online, that node is used to apply the write. If neither node is online, the writes will be recovered later. The surviving nodes 220 of the clustered data storage system 200 will store the fact that each volume accessible through those unavailable nodes 220 needs all non-volatile writes to be applied as soon as either node is available again. The nodes 220 will restore the set of writes from non-volatile memory to be written to that volume.

The writes for offline or otherwise inaccessible volumes that are in non-volatile memory are referred to as pinned writes. It is preferable to minimise the quantity of pinned writes, as these writes take up non-volatile memory capacity that otherwise could be used to accelerate writes to other volumes. It is known per se to provide a feature where connected clusters of nodes 220 communicate the online/offline state of all volumes, such that the primary worker nodes 110 may stop transmitting writes to the secondary worker nodes 220 for a volume that has gone offline as soon as possible in order to minimize the number of pinned writes. In an embodiment, a user is notified of the existence of pinned writes using an error notification system of the data storage architecture to warn the user that performance may be impacted, and to request that the user takes whatever actions are required to return the volume to an online state.

When a write has been successfully written, it is removed from both the preferred worker node 220 and its partner node using a Soften message as previously explained. If only one secondary worker node 220 servicing the volume is online, the surviving secondary worker node 220 writes and softens the data by itself. The offline node is remembered by the rest of the clustered secondary nodes 220 to no longer have valid data for that volume, and all of that data is therefore discarded when this offline node becomes online again. If the write fails due to the volume going offline again, any writes not yet applied, or applied but are retained in non-volatile storage to be applied when possible.

Figure 3:
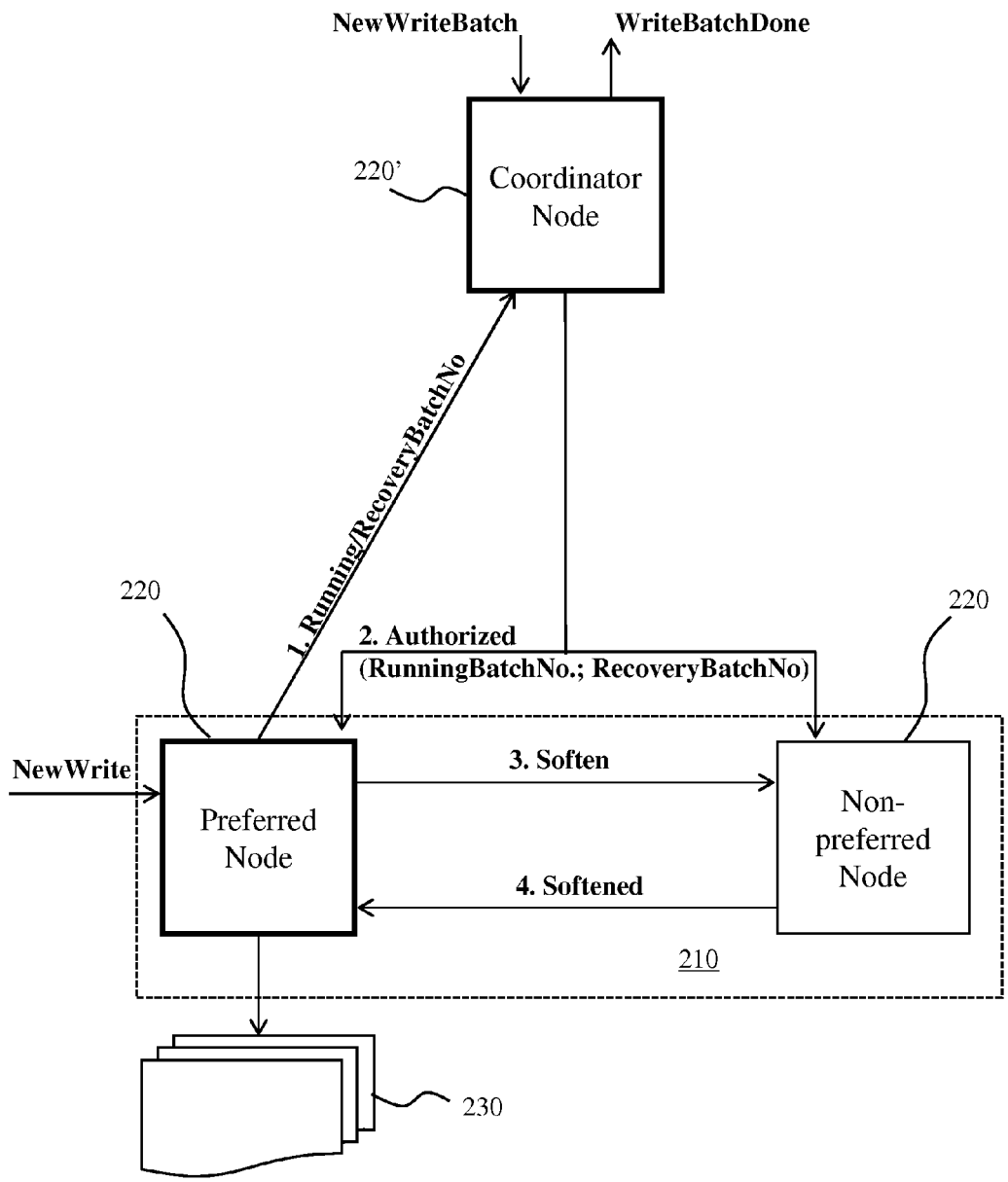
FIG. 3 schematically depicts communications between the various nodes of a data storage system in a second operating mode according to an embodiment of the present invention.

A second exception may be that communications are temporarily interrupted between the primary data storage system 100 and the secondary data storage system 200, or that any of the secondary nodes 220 changes availability, i.e. goes offline or online. In such a situation, the following recovery scenario is applied, which is explained with the aid of FIG. 3. A primary worker node 110 will assume that any writes for which it has not received a WriteDone message need to be re-sent to the secondary data storage system 200. Likewise, if a volume of the data storage source 230 goes offline, the primary worker node 110 will assume that any writes for that volume need to be resent. In these cases, the primary worker node 110 will re-send all writes using the same sequence numbers as for the previous attempt. This is already routinely applied in existing data storage architectures.

Before the secondary worker nodes 220 may consider these new writes, they must resolve what to do with the currently processing writes stored in non-volatile memory. At this point it is noted that the interruption may have removed the secondary node 220 that was acting as secondary coordinator node 220'. In this case, it is necessary to first resolve which of the secondary nodes 220 is going to assume the role of the coordinator node 220', i.e the role of coordinator node 220' is dynamically assigned to one of the available secondary nodes 220.

Once it is determined which node takes on the role of coordinator node, the next step is to choose a batch sequence number for the secondary nodes 220 to roll forward to. This is achieved by retrieving the recovery batch sequence numbers stored in non-volatile memory of one or more of these nodes 220. In an embodiment, any secondary worker node 220 may be selected for the retrieval of the batch recovery sequence number, which retrieved batch recovery sequence number may subsequently be sent to all secondary worker nodes 220 in the form of an Authorized message with both recovery and running sequence numbers set to the retrieved recovery sequence number. All secondary worker nodes 220 will attempt to roll forward all volumes to that sequence number, leaving all the volumes consistent with each other. Any writes from later sequence numbers are discarded.

At this point, it is noted that in the above scenario the secondary data storage system 200 may roll forward to a point in time that is not the latest point in time the system can roll forward to, for instance if a recovery batch sequence number has been retrieved from a secondary worker node 220 that is not the highest recovery batch sequence number that exists across the nodes 220 of the data storage system 200. This is not considered a serious drawback is the main objective is to roll forward to a data state that is consistent with the data at the corresponding point in time on the primary data storage system 100. Nevertheless, in an alternative embodiment the recovery batch sequence number communicated to all secondary worker nodes 220 may be retrieved by retrieving the respective recovery batch sequence numbers from respective non-volatile memories of the secondary worker nodes 220 and selecting the highest retrieved recovery batch sequence number, which guarantees that the secondary data storage system 200 will roll forward to the latest possible point in time for which consistency with the primary data storage system 100 can be guaranteed. This guarantee comes at the price of increased data communication between the nodes 220 in establishing the highest recovery batch sequence number that exists across the secondary data storage system 200.

As the recovery batch sequence number is guaranteed to have all required writes hardened on all secondary worker nodes 220 as previously explained, this guarantees that all these nodes will be able to roll forward to that sequence number. As the recovery sequence number is guaranteed to be at least as great as all running sequence numbers across the secondary data storage system 200, and no secondary worker node 220 will have applied writes later than the running sequence number, no secondary worker node 220 will have to undo any already-applied write to achieve consistency at the chosen batch sequence number.

As before, if the preferred worker node 220 responsible for maintaining a volume of the data storage source 230 is online and able to apply writes, this node will be responsible for applying these recovery writes to reach the chosen sequence number. Otherwise, one of the redundant or companion secondary worker nodes 220 will apply these writes. As these writes are completed, WriteDone messages are not sent as the primary worker node 110 is not expecting such messages following an interruption. Instead, the writes are simply softened as previously described for the available secondary nodes 220 across the group 210.

If for a group 210 only one secondary worker node 220 is online after all the volumes have been successfully recovered, the missing node(s) of that group are recorded on all the surviving secondary nodes 220 as being out of date. If the missing node becomes available again at a later point in time, the other secondary nodes 220 instruct the returning node to discard all its hardened data to avoid polluting the volumes of the data storage source 230 with out of date recovery data.

If none of the secondary nodes 220 of the group 210 with access to a particular volume of the data storage source 230 is online, no recovery may take place on volumes accessible through those nodes until at least one of these nodes becomes available again. In this case, all volumes will require recovery as in the previous section as soon as the node has become available. The rest of the secondary worker nodes 220 (i.e. the secondary worker nodes of other groups 210) record that the volume must be recovered up to the chosen recovery sequence number such that this volume can be recovered in a consistent manner. As soon as one of the secondary worker nodes 220 associated with the aforementioned particular volumes becomes online, it will apply all writes up to the chosen recovery batch sequence number, and will discard write actions belonging to batches having a higher batch sequence number.

If every secondary worker node 220 of the secondary data storage system 200 is offline, no recovery may happen. In this scenario, as soon as any of the secondary nodes 220 becomes online, it will start recovery, choose a recovery batch sequence number, applying writes up to that, and discarding later writes. As each other secondary nodes 220 become online, these nodes will recover to the recovery batch sequence number chosen by the first secondary node 220 to have become online again.

As before, if a volume is offline during recovery, the writes for that volume are left in non-volatile memory of the responsible secondary worker nodes 220 to be written to that volume as soon as possible. All secondary nodes 220 in the secondary data storage system 200 store the chosen recovery batch sequence number for that volume as previously explained. The preferred secondary worker node 220 and its partner node(s) can discard writes after the chosen recovery batch sequence number, as these writes will never be written. This helps to minimise the amount of pinned data from an offline volume.

If a recovery process is interrupted by a further secondary worker node 220 going online or offline, or by any other communications interruption, this recovery process starts again from the beginning. So for instance it is possible for a volume to be partially recovered by one secondary worker node 220, then fully recovered by its partner node, if the preferred node for that volume goes offline during recovery. The same recovery sequence number is used in all recovery attempts until all online volumes have been successfully recovered.

Once all writes needing recovery have been applied to all accessible volumes, recovery is deemed to have completed. All inaccessible volumes will be recovered when becoming accessible again, and are assumed to no longer be taking part in the replication process. The secondary data storage system 200 has no non-volatile storage associated with volumes that still require replication, such that all online secondary worker nodes 220 are now considered to have up-to-date data for all volumes they are responsible for.

Upon completion of the recovery process, new writes may be sent from the primary nodes 110 to the secondary nodes 220. As many of the NewWrite messages may be retransmissions of writes already received and written by the secondary nodes 220, it is important that reapplying older writes does not undo changes made during the recovery process. For this reason, every retransmitted write with sequence numbers up to and including the sequence number just used for recovery is not applied to the data storage source 230 by the secondary nodes 220. Instead, the secondary nodes 220 send a WriteHardened message to the secondary coordinator node 220' for these writes, and the WriteDone message is sent to the primary worker node as though the write had been hardened and applied.

Replication may be disrupted either through the primary data storage system 100 and the secondary data storage system 200 losing connectivity, or by the primary data storage system 100 choosing to stop replication. If the primary data storage system 100 and the secondary data storage system 200 lose connectivity, the secondary nodes 220 will choose a recovery batch sequence number to consistently role forward to as previously explained. If the primary data storage system 100 chooses to stop replication, this system will stop sending writes in a consistent way. In this case, as long as the secondary coordinator node 220' and all secondary nodes 220 continue to process the writes being sent, the secondary data storage system 200 will eventually have replicated all the remaining writes in a consistent fashion.

At this point, the secondary volume is completely consistent, and may be read consistently. Write access may be provided using the standard DR failover method of the system. All writes from the primary data storage system 100 for any volume of the data storage source 230 must be completed before new local reads and writes may be processed. If a volume is not accessible at the point where local write access is enabled, when the volume becomes accessible, all hardened writes up to the recovery batch sequence number associated with that volume must be applied before new any reads and writes may be processed.

As mentioned before, the non-volatile memory for each secondary node 220 may be considered out-of-date or up-to-date for each volume accessible through it. Upon initialisation and following a successful recovery of a volume, any of the secondary nodes 220 that a volume is accessible through that is online at the time is considered up-to-date. These are the only times that a secondary node 220 that is out-of-date may be considered up-to-date again.

If all secondary worker nodes 220 of a group 210 through which a volume is accessible are offline or if the only up-to-date secondary worker node 220 or the associated volume of the data storage source 230 is offline, the set of up-to-date secondary nodes 220 of that group is left unaltered. If the secondary nodes 220 of the group 210 were previously up-to-date, these nodes remain up-to-date; if only one of these nodes 220 was considered up-to-date before the recovery, that node remains the only up-to-date node for its associated set of volumes. This is because the state of the volume cannot change while it is completely inaccessible, and at least one secondary node 220 is guaranteed to be up-to-date for any given volume. Recovery will not complete successfully for this volume, and will need to be reattempted the next time the secondary data storage system 200 has reason to attempt a recovery. As a secondary worker node 220 going online or offline drives recovery as previously explained the set of online secondary nodes 220 remains constant between recoveries. Consequently, the set of up-to-date secondary nodes 220 remains constant for every volume of the data storage source 230 from the end of one recovery cycle to the start of the next.

In the unlikely event of a failure of the last recovery, the secondary data storage system 200 will be unable to process further writes. The primary nodes 110 are made aware of this in any suitable manner such that these primary nodes can refrain from sending further writes to the secondary nodes 220.

On the other hand, if the last recovery succeeded, a volume of the data storage source 230 is accessible through at least one secondary worker node 220 as previously explained. In an embodiment where the secondary data storage 200 comprises groups 210 of secondary nodes 220, a situation may arise where there is only one secondary worker node 220 through which a volume is accessible, for instance because the other nodes of the group 210 have gone off-line. In this situation, the following choices may be given to the user of the data storage architecture:

The user may suspend replication, preventing the single online secondary worker node 220 being a single point of failure. This prioritises availability over currency. In this scenario, no further replication writes will be processed by the group 210 until all its nodes 220 (typically both nodes as a group 210 preferably contains two nodes 220) are online, at which point these secondary nodes 220 can be considered up-to-date Instead, the user may choose to continue replication, allowing writes to be hardened on the single online secondary worker node 220. This maintains data currency at the expense of resilience, as only one node will contain the hardened data needed to make the secondary volume consistent. Resilience may be considered less important here, as this is already an error scenario, and a double failure need to occur in order to lose consistency between the data at the primary data storage system 100 and the secondary data storage system 200. In this scenario, the online secondary worker node 220 making progress and hardening writes has the only up-to-date non-volatile storage for volumes of the data storage source 230 accessible through this node. That up-to-date secondary worker node 220 is required to complete any recovery; if only an out-of-date node 220 is online, recovery may not happen until the up-to-date node 220 of the group 210 is online again. Once both nodes 220 of the group 210 are online and recovery has completed successfully, both nodes will both become up-to-date again such that from that point onwards both secondary nodes 220 of that group will take part in hardening further writes again, as previously explained in further detail with the aid of FIG. 2.

When a secondary worker node 220 with out-of-date non-volatile data becomes online, the non-volatile data is discarded as it is guaranteed that its partner node will have already applied any writes being discarded. Any online volumes will become up-to-date on that secondary worker node 220 if its partner node is online, as a secondary worker node 220 going online triggers recovery as previously explained, thus flushing any earlier data from non-volatile memory.

In an embodiment, the state of the non-volatile memory associated with a particular volume being up-to-date or out-of-date is stored in a system memory of the secondary data storage system 200, as is well known per se.

At this point it is noted that several variations to the aforementioned embodiments of the present invention may be contemplated without departing from the teachings of the present invention. For instance, in the above description inter-node messages of a particular type, e.g. Soften, Harden, Softened, or Hardened messages are sent individually. It is however equally feasible to batch together some of these messages into a single batch message to minimize bandwidth consumption and messaging resources.

Where messages are being sent between the secondary coordinator node 220' and a secondary worker node 220 implemented on the same node, the messages between these different roles on the same node may take the form of function calls.

Embodiments of the present invention may exist multiple times on the same nodes 220, where each instance represents a set of volumes that must be copied consistent with each other. For each set of volumes being replicated, there may be a different set of sequence numbers, a different recovery and running sequence number, and a different node 220 chosen as the coordinator. Each set of volumes will have no impact on the other sets, as their respective sequence numbers are free to run at different rates, and their recovery may happen at different times. This allows isolation of any performance issues, and spreads the additional system workload of the coordinator role across the nodes 220.

The various embodiments of the method of the present invention may be stored on a computer program product comprising a computer-readable storage medium. The computer-readable storage medium may be any medium that can be accessed by a computer for the retrieval of digital data from said medium. Non-limiting examples of a computer-readable storage medium include a CD, DVD, flash memory card, a USB memory stick, a random access memory, a read-only memory, a computer hard disk, a storage area network, a network server, an Internet server and so on.

In the context of the present application, a (computer) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A data storage system for replicating data from an external server providing a sequence of batches comprising independent write actions, the data storage system comprising:
   a data storage resource comprising a plurality of data storage volumes; and
   a plurality of nodes communicatively coupled to each other and to the data storage resource, each node having access to a non-volatile memory and being adapted to receive a write request including a write action belonging to one of said batches and a batch sequence number identifying the position of said batch in said sequence from the external server and to store the write request into its non-volatile memory;
   the system comprising a further node adapted to act as a coordinator node, said coordinator node being adapted to:
   receive batch information from the external server indicating the batch sequence number and the number of write actions in said batch; and
   periodically communicate with the other nodes to determine the highest batch sequence number for which all write actions have been written into the respective non-volatile memories and to communicate a first batch sequence number indicative of the highest batch sequence number to the other nodes;
   wherein each node is further adapted to:
   store the communicated first batch sequence number;
   replicate all write actions belonging to any batch having a sequence number not exceeding the communicated first batch sequence number from its non-volatile memory to a data storage volume in sequential order; and
   upon completion of the replication, remove the corresponding write request from its non-volatile memory.

2. The data storage system of claim 1, wherein the nodes are grouped into groups comprising an active node and at least one failover node, each group being responsible for replicating said write actions to a unique set of data storage volumes, wherein each node in the group is further adapted to:
   store the write request into its non-volatile memory in response to a store instruction from one node in said group receiving the request; and
   acknowledge completion of the write instruction to the one node; and
   wherein one node in said group is further adapted to communicate to the coordinator node that the request is stored in the respective non-volatile memories of all nodes in said group upon receiving the acknowledgements from the other nodes in said group.

3. The data storage system of claim 1, wherein each node is adapted to compare the respective target addresses of the write instructions stored in its non-volatile memory and to initiate replicating a next write instruction before the completion of the replication of a previous write instruction if the next write instruction has a unique target address in the non-volatile memory.

4. The data storage system of claim 1, wherein the first batch sequence number is the previous highest batch sequence number successfully transmitted to all other nodes;

and wherein the coordinator node is further adapted to communicate the highest batch sequence number to all available nodes.

5. The data storage system of claim 1, wherein the coordinator node is further adapted to send a batch completion message for a particular batch to the external server upon the highest batch sequence number exceeding the batch sequence number of the particular batch.

6. The data storage system of claim 1, wherein the further node is a node of said plurality of nodes, and wherein the system is adapted to dynamically assign the role of coordinator node to one of said nodes at initialization or after failure of the previously assigned coordinator node.

7. The data storage system of claim 1, wherein the system is further adapted to select a highest batch sequence number stored in the non-volatile memory accessible by one of said nodes upon the external server resending one or more previously received write requests; and
    wherein the coordinator node is adapted to communicate the selected highest batch sequence number to the other nodes; and
    wherein each node is adapted to replicate all write actions belonging to any batch having a sequence number not exceeding the communicated selected first batch sequence number from its non-volatile memory to a data storage volume.

8. The data storage system of claim 7, wherein the system is further adapted to select the highest batch sequence number stored in the non-volatile memory accessible by said nodes.

9. A data storage architecture including a primary data storage system and a secondary data storage system comprising the data storage system of claim 1 for backing up the primary data storage system, wherein the primary data storage system comprises:
    a plurality of primary nodes each adapted to issue a write request to one of the nodes of the secondary data storage system; and
    a primary server adapted to send batch information to the coordinator node of the secondary data storage system.

10. The data storage system of claim 1, wherein the system is further adapted to select a highest batch sequence number stored in the non-volatile memory accessible by one of said nodes upon the external server resending one or more previously received write requests, and the coordinator node is adapted to communicate the selected highest batch sequence number to the other nodes.

11. The data storage system of claim 1, wherein the system is further adapted to select a highest batch sequence number stored in the non-volatile memory accessible by one of said nodes upon the external server resending one or more previously received write requests, and each node is adapted to replicate all write actions belonging to any batch having a sequence number not exceeding a communicated selected first batch sequence number from its non-volatile memory to a data storage volume.

12. A method of replicating data from an external server providing a sequence of batches comprising independent write actions onto a data storage system comprising a plurality of nodes with each node having access to a non-volatile memory and a data storage resource comprising a plurality of data storage volumes, wherein each node is associated with a set of data volumes, the method comprising:
    appointing one of said nodes as a coordinator node;
    receiving, on the coordinator node, batch information from the external server indicating the batch sequence number and the number of write actions in said batch;
    receiving, on one of said nodes, a write request including a write action belonging to one of said batches and a batch sequence number identifying the position of said batch in said sequence from an external server and to store the write request into its non-volatile memory;
    informing the coordinator node that the write request has been stored into the non-volatile memory;
    determining, at the coordinator node, the highest batch sequence number for which all write actions have been written into the respective non-volatile memories;
    communicating a first batch sequence number indicative of the highest batch sequence number from the coordinator node to the other nodes;
    storing the communicated first batch sequence number in the non-volatile memories of all nodes receiving said communication;
    and for each node receiving said communication:
    replicating all write actions belonging to any batch having a sequence number not exceeding the communicated first batch sequence number from its non-volatile memory to a data storage volume in sequential order; and
    removing the corresponding write request from its non-volatile memory upon completion of the replication.

13. The method of claim 12, wherein the nodes are grouped into groups comprising an active node and at least one failover node, each group being responsible for replicating said write actions to a unique set of data storage volumes, the method further comprising:
    for each node in a group:
    storing the write request into its non-volatile memory in response to a store instruction from one node in said group receiving the request; and
    acknowledging completion of the write instruction to the one node; and
    communicating to the coordinator node that the request is stored in the respective non-volatile memories of all nodes in said group upon receiving the acknowledgements from the other nodes in said group.

14. The method of claim 12, further comprising, for each node:
    comparing the respective target addresses of the write instructions stored in its non-volatile memory; and
    initiating replication of a next write instruction before the completion of the replication of a previous write instruction if the next write instruction has a unique target address in the non-volatile memory.

15. The method of claim 12, wherein the first batch sequence number is the previous highest batch sequence number successfully transmitted to all other nodes; the method further comprising communicating the highest batch sequence number from the coordinator node to all available nodes.

16. The method of claim 12, further comprising sending a batch completion message for a particular batch from the coordinator node to the external server upon the highest batch sequence number exceeding the batch sequence number of the particular batch.

17. The method of claim 12, further comprising:
    selecting a highest batch sequence number stored in the non-volatile memory of one of said nodes upon the external server resending one or more previously received write requests; and communicating the selected highest batch sequence number from the coordinator node to the other nodes; and at each node, replicating all write actions belonging to any batch having a sequence number not exceeding the communicated selected first batch sequence number from its non-volatile memory to a data storage volume.

18. The method of claim 12, further comprising:

selecting a highest batch sequence number stored in the non-volatile memory of one of said nodes upon the external server resending one or more previously received write requests; and communicating the selected highest batch sequence number from the coordinator node to the other nodes.

19. The method of claim 12, further comprising:

selecting a highest batch sequence number stored in the non-volatile memory of one of said nodes upon the external server resending one or more previously received write requests; and at each node, replicating all write actions belonging to any batch having a sequence number not exceeding a communicated selected first batch sequence number from its non-volatile memory to a data storage volume.

* * * * *